United States Patent [19]
Erteza

[11] Patent Number: 5,706,114
[45] Date of Patent: Jan. 6, 1998

US005706114A

[54] POLYHEDRAL INTEGRATED AND FREE SPACE OPTICAL INTERCONNECTION

[76] Inventor: Ireena A. Erteza, 913 McDuffie Cir., NE., Albuquerque, N. Mex. 87110

[21] Appl. No.: 538,683

[22] Filed: Oct. 3, 1995

[51] Int. Cl.$^6$ ............................................. H04B 10/00
[52] U.S. Cl. ........................... 359/159; 359/130; 359/15; 385/14
[58] Field of Search ......................... 359/15, 109, 113, 359/130, 159, 163, 169–170, 1, 10; 385/14, 37; 367/8

[56] References Cited

U.S. PATENT DOCUMENTS

| | | | |
|---|---|---|---|
| 5,061,027 | 10/1991 | Richard | 385/14 |
| 5,101,460 | 3/1992 | Richard | 385/37 |
| 5,237,434 | 8/1993 | Feldman et al. | 359/15 |
| 5,513,021 | 4/1996 | Kaneshiro et al. | 385/14 |

FOREIGN PATENT DOCUMENTS 4019712  9/1994  WIPO ................................ 359/15

*Primary Examiner*—Kinfe-Michael Negash
*Attorney, Agent, or Firm*—Timothy D. Stanley

[57] ABSTRACT

An optical communication system uses holographic optical elements to provide guided wave and non-guided communication, resulting in high bandwidth, high connectivity optical communications. Holograms within holographic optical elements route optical signals between elements and between nodes connected to elements. Angular and wavelength multiplexing allow the elements to provide high connectivity. The combination of guided and non-guided communication allows compact polyhedral system geometries. Guided wave communications provided by multiplexed substrate-mode holographic optical elements eases system alignment.

17 Claims, 7 Drawing Sheets

POLYHEDRAL INTEGRATED AND FREE SPACE OPTICAL INTERCONNECTION

This invention was made with Government support under Contract DE-AC04-94AL85000 awarded by the U.S. Department of Energy. The Government has certain rights in the invention.

BACKGROUND OF THE INVENTION

This invention relates to an optical interconnection method and apparatus for providing high interconnectivity within computing and communication systems.

Communication performance is a primary limitation on the performance of many electronic systems. Semiconductor processing advances enable ever-smaller, ever-faster devices. Smaller, faster devices require more communication bandwidth, in less space, than do larger, slower devices. Semiconductor technology has outpaced communications technology, so that now communication, rather than device speed, is the primary limitation on the performance of many systems.

Optical communication has characteristics that show promise for overcoming the communication limitation. Optical communication is significantly faster than electrical communication. Light beams also do not interfere with each other, so optical communication paths can cross without corrupting information. Goodman in Proceedings IEEE, Vol. 72, #7, Jul. 1984, and Brenner in Applied Optics, Vol. 27, #20, 15 Oct. 1988, describe free space optical communication configurations. These configurations are typically bulky and hard to align.

Multiple waveguide holograms or diffractive optics can yield compact, easy to align systems using conventional transmissive or reflective Bragg holography. The holograms can be surface etched gratings, volume holograms or diffraction gratings, as described by Collier in "Optical Holography," 1971, and Solymar and Cooke in "Volume Holography and Volume Gratings." Topologies based on these elements are known to those skilled in the art.

Previous topologies follow conventional electrical communication geometries. These include rectilinear, planar, stacked parallel and multiplanar geometries. These topologies are suitable for use in many current electronic systems. None, however, take full advantage of the non-interference properties of optical communications.

SUMMARY OF THE INVENTION

An object of the present invention is to provide a communication system capable of multi-dimensional connections using the non-interference properties of optical communications.

Another object of the present invention is to provide an extensible communication system that uses substrate mode holographic elements in a non-planar geometry.

Another object of the present invention is to provide for easier alignment by combining guided and non-guided communications in a single system.

Another object of the present invention is to provide an optical communication system that can scale in multiple dimensions to provide increased communication connectivity and bandwidth.

A further object of the present invention is to improve connectivity and bandwidth by using wavelength and angular multiplexing to interconnect multiple holographic elements.

Additional objects, advantages, and novel features will become apparent to those skilled in the art upon examination of the following description or may be learned by practice of the invention. The objects and advantages of the invention may be realized and attained by means of the instrumentalities and combinations particularly pointed out in the appended claims.

The present invention is a compact, all optical interconnect that takes full advantage of the non-interference properties of optical paths. The invention combines guided and non-guided wave propagation in a polyhedral interconnection geometry. The invention uses holographic optical elements that employ wavelength and angular multiplexing. The invention provides interconnections on both sides of a planar substrate. The items to be interconnected, or nodes, can be arranged on the faces of three-dimensional polyhedrons. There can be multiple nodes within a given facet of a polyhedron, and multiple polyhedrons can be cascaded to provide interconnections between nodes on all the polyhedrons.

This invention connects transmitter and receiver nodes to holographic optical elements mounted with each facet. Each holographic optical element has internal holograms that can establish optical paths between transmitter and receiver nodes. Each facet can also have inter-facet transmitters and receivers. The holograms can also establish optical paths including the inter-element transmitters and receivers. Multiple facets are arranged so that optical signals from inter-facet transmitters impinge on inter-facet receivers with appropriate wavelength and incidence angle to establish optical paths between facets. In this way, transmitter and receiver nodes can communicate with others connected to the same or different facets.

The multiple holographic elements can be arranged in any way that allows the required wavelength and incidence angle matching. Arranging the holographic elements on the faces of polyhedrons can yield desirable results, since each face can directly or indirectly communicate with all the other faces. Intra-facet communication is also possible. Stellated polyhedrons can accommodate more facets, although the inter-facet communication paths might be more limited.

The present invention can also be scaled to connect larger numbers of nodes. Holographic elements can provide optical signal routing between polyhedral implementations. Sandwich nodes can also provide paths between polyhedral implementations. The use of similar shapes and sizes yields good packing density, while the use of optical communication provides high bandwidth.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

Figure 1:
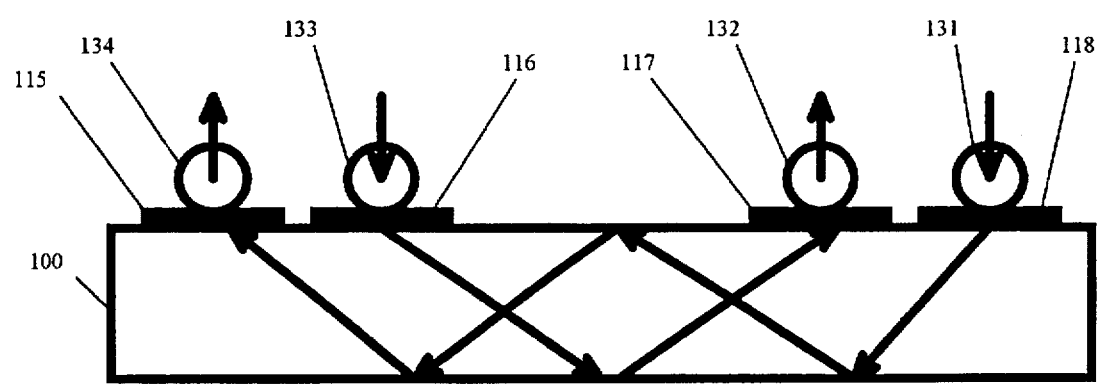
FIG. 1 is a sectional view through a prior art optical communications system.

FIG. 1 shows a prior art communications system using holographic optical elements. A substantially planar plate 100 is optically transmissive. Holographic optical elements 115, 116, 117, 118 connect to the plate. A first optical transmitter 131 connects with element 118. A second optical transmitter 133 connects with element 116. A first optical receiver 134 connects with element 115. A second optical receiver 132 connects with element 117. The elements all have internal holograms that route optical signals to accomplish a desired interconnection. For example, element 118 can convert a signal from transmitter 131 into a first guided wave with a distinct propagation angle. The first guided signal propagates within the plate, reaching element 115. Element 115 then routes the incident signal to receiver 134. Similarly, element 116 can convert an optical signal from transmitter 133 into a second guided wave. The second guided wave propagates through the substrate, reaching element 117. Element 117 routes the signal to receiver 132. Different arrangements of elements and different internal holograms can accomplish different interconnections. The transmitters and receivers must all connect to the same planar substrate.

Figure 2:
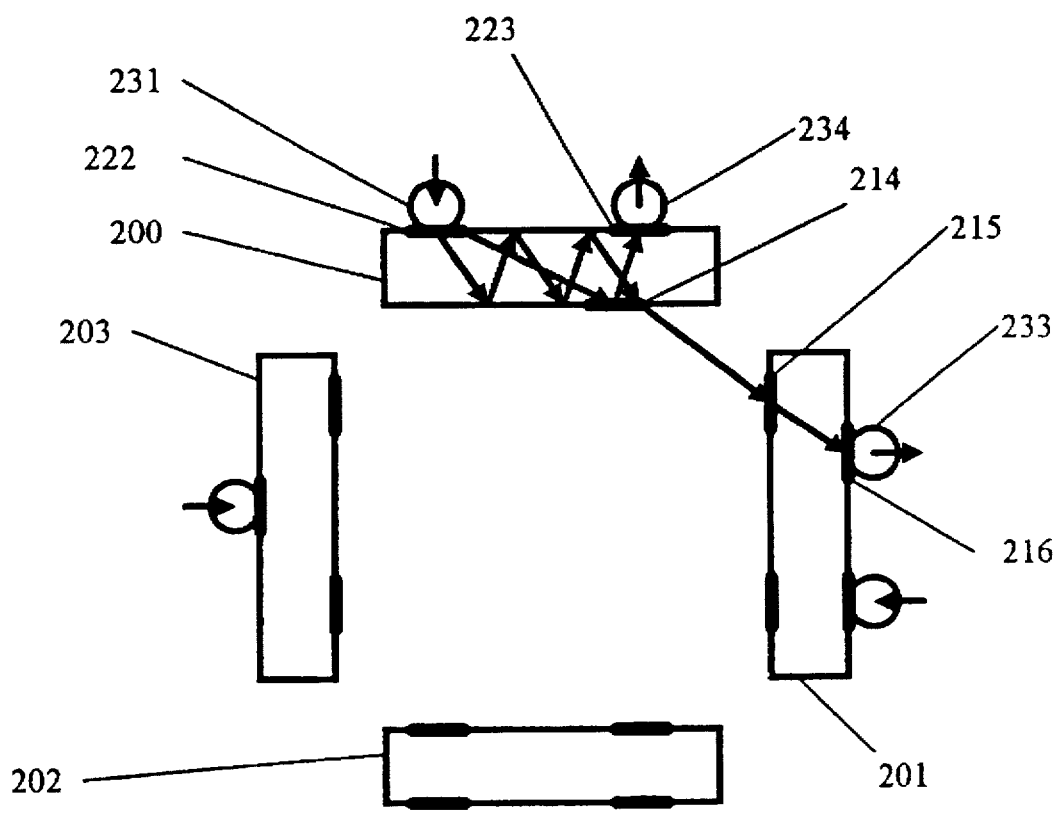
FIG. 2 is a sectional view through one embodiment of the present invention.

FIG. 2 shows a sectional view of one embodiment of the present invention. The figure shows four optically transmissive plates 200, 201, 202, 203, arrayed in a polyhedron (the section through the polyhedron shows a square). The space contained within the polyhedron can be free space or can be a material with known refractive properties. Holographic optical elements connect with the plates. Each element can contain multiple holograms, including reflective and transmissive holograms. The holograms within the elements route optical signals to accomplish the desired interconnection. For example, a hologram in element 222 converts an optical signal from transmitter 231 into a first guided signal in substrate 200. The first guided signal travels via total internal reflection in the substrate 200 to element 214. A hologram in element 214 converts the incident first guided signal into a first non-guided signal. The first non-guided signal propagates to element 215, connected with a different facet 201. A hologram in element 215 converts the incident first non-guided signal into a second guided signal. The second guided signal propagates to element 216, where an internal hologram routes the signal to receiver 233. The figure also shows an intra-facet communication path, from transmitter 231 to receiver 234 via transmissive holograms in elements 222, 223 and a reflective hologram in element 214.

The holograms provide optical paths that can begin at transmitters and can end at receivers. Optical paths can traverse the space or material between the plates. The optical signal from a first element can be matched with a second element so that the incidence angle and wavelength correspond with that needed by a specific hologram in the second element. Multiple holograms can occupy the same volume. Each hologram can establish a unique optical path by accepting an optical signal with a unique angle of incidence or wavelength. Each hologram can direct its input signals along the appropriate output path. Since the holograms are sensitive to both incidence angle and wavelength, the multiple optical paths do not interfere.

Figure 3:
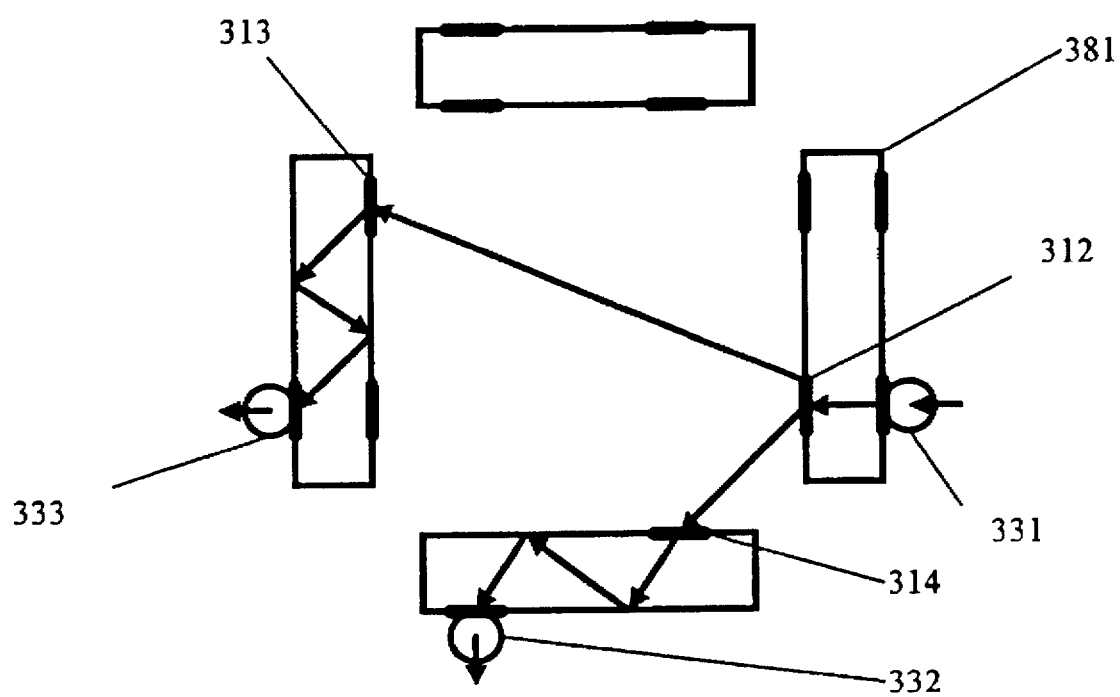
FIG. 3 is a sectional view of another embodiment of the present invention.

FIG. 3 shows a sectional view of the present invention being used to broadcast an optical signal. An optical signals starts from an optical transmitter 331 mounted with an optically transmissive plate 381. Two transmissive holograms in element 312 direct the signal in two directions: to a first element 313 and to a second element 314. A transmissive hologram in the first element 313 directs the signal to a first receiver 333. A transmissive hologram in the second element 314 directs the signal to a second receiver 332. Additional transmissive and reflective holograms in the same or different elements could provide additional routing of the signal. Each element can direct multiple optical signals from multiple sources to multiple destinations as long as each signal has a unique combination of wavelength and angle of incidence.

Figure 4:
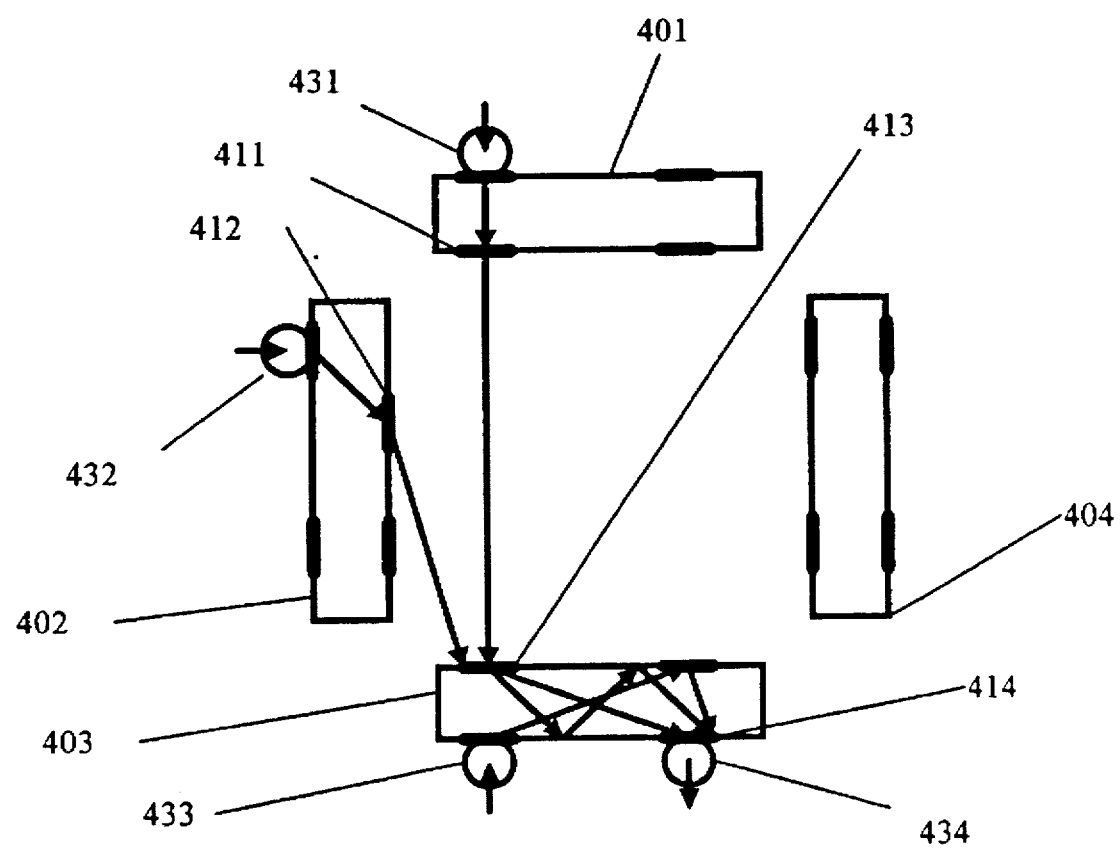
FIG. 4 is a sectional view of another embodiment of the present invention.

FIG. 4 shows an embodiment of the present invention used to route multiple transmitters to a single receiver. Signals from transmitter 431 propagate within attached plate 401 to element 411. Signals from transmitter 432 propagate within attached plate 402 to element 412. Holograms within elements 411, 412 route the signals as unguided signals to element 413. Holograms in element 413 convert the incident unguided signals to guided signals. The guided signals propagate to element 414 where internal holograms route the signal to receiver 434. Transmitter 433 also connects to the receiver 434 through intra-facet communication as discussed before.

Figure 5:
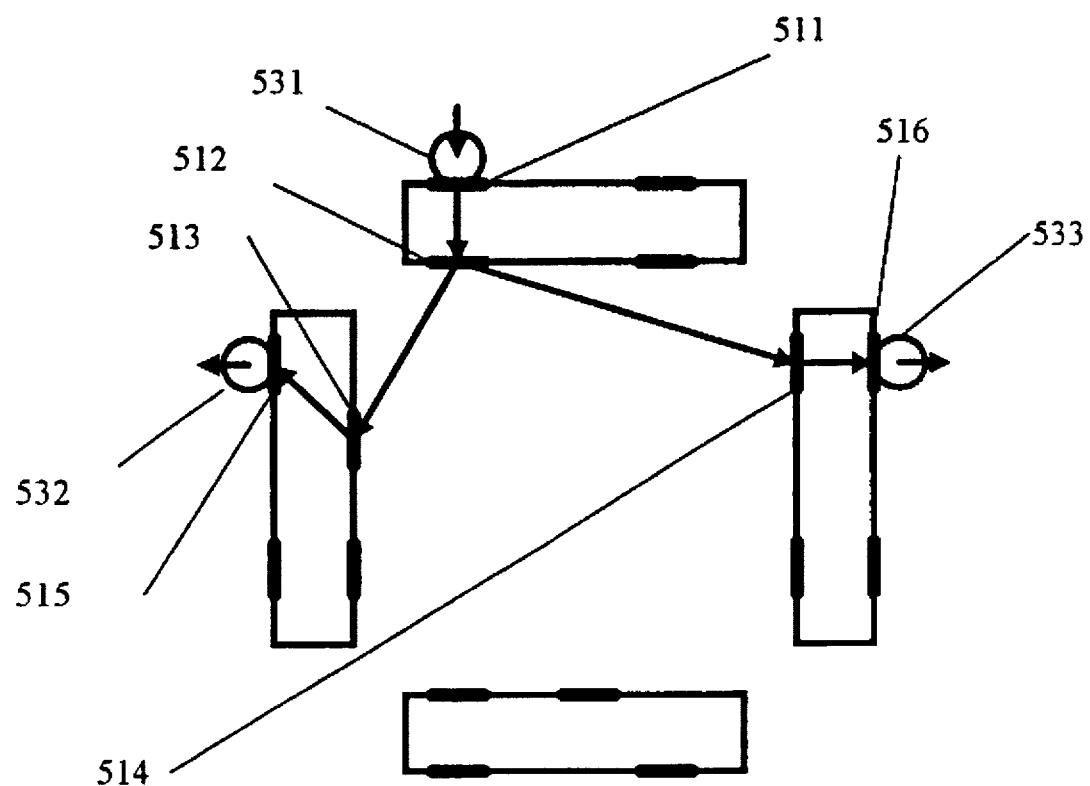
FIG. 5 is a sectional view of another embodiment of the present invention.

FIG. 5 shows how the present invention can transmit timing-critical signals in phase. The timing signal originates at transmitter 531. A first transmissive hologram in element 511 directs the signal to second and third transmissive holograms in element 512. The second and third holograms direct the signal to third and fourth elements 513, 514. A hologram in the third element 513 directs the signal to a first receiver 532 via element 515. A hologram in the fourth element 514 directs the signal to a second receiver 533 via element 516. If the transit time from transmitter 531 to the first receiver 532 is the same as that to the second receiver 533, then the signals will arrive at the receivers in phase. The transit times will match as long as the total optical path lengths match. Proper placement of the holographic optical elements can make the optical path length match. The polyhedral geometries and angular multiplexing of holograms in the present invention allows flexibility in placement of the holographic optical elements.

Figure 6:
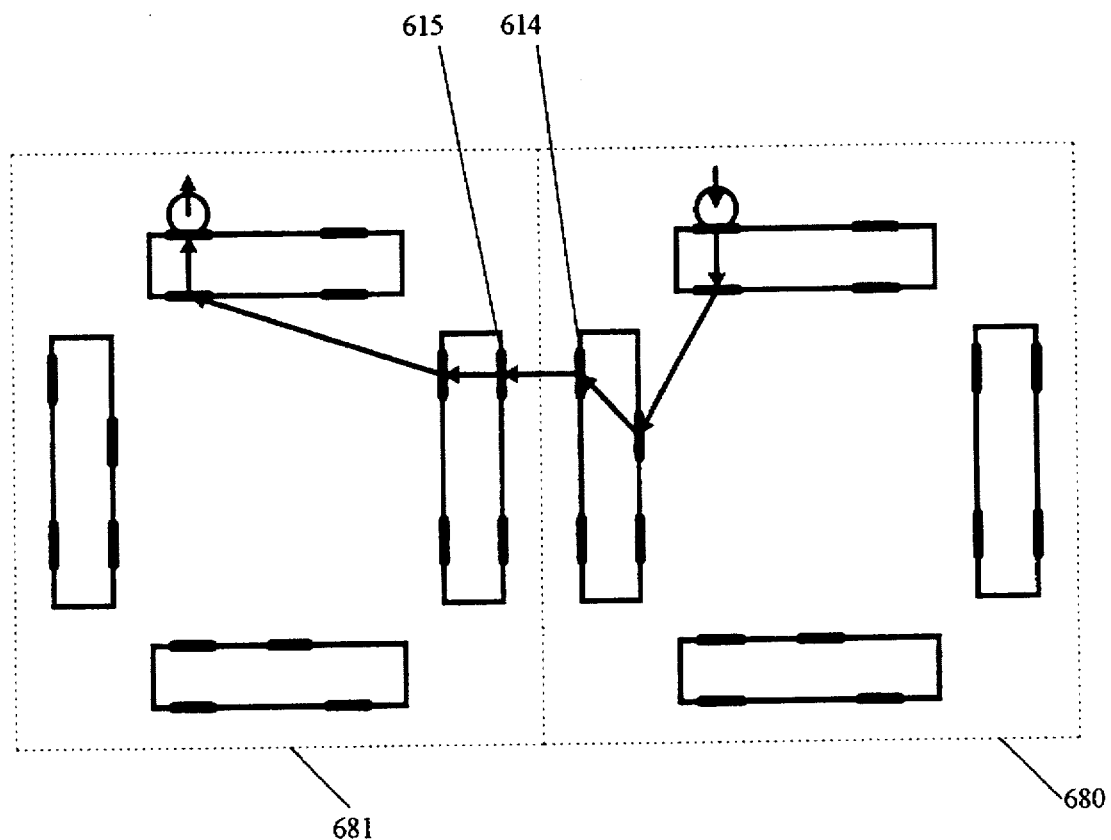
FIG. 6 is a sectional view of another embodiment of the present invention.

FIG. 6 shows a cascaded polyhedral interconnect according to the present invention. Transmissive holograms in elements 614, 615 direct signals between multiple polyhedrons 680, 681. Communications within each polyhedron are as discussed before. Communications between the polyhedrons traverse elements such as 614, 615.

Figure 7:
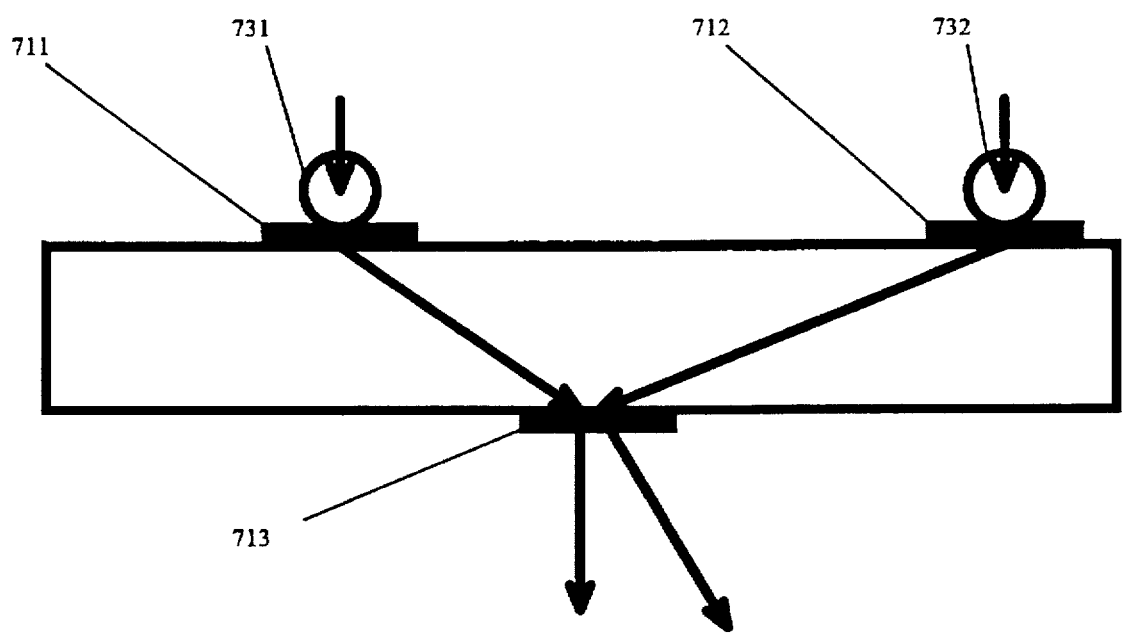
FIG. 7 is a sectional view of another embodiment of the present invention.

FIG. 7 shows how a single holographic optical element can route multiple optical signals. First and second transmitters 731, 732 initiate optical signals. Holograms in first and second elements 711, 712 direct the signals to a third holographic optical element 713. Two different holograms in the third element 713 direct the signals along different paths. Each hologram is sensitive to a particular incidence angle and wavelength. The holograms in the third element can differentiate between the two signals because the incidence angles are different. The holograms could also differentiate between the two signals if the signals wavelengths were different. Since the element 713 contains multiple holograms, each sensitive to a different combination of incidence angle and wavelength, the single element 713 can connect multiple sources to multiple destinations.

Each element can contain the combination of reflective and transmissive holograms needed to accomplish the desired interconnection. Those skilled in the art will appreciate many methods of fabricating suitable holograms, including surface etched gratings, volume holograms, or diffraction gratings. The arrangement of facets can allow non-guided inter-facet signals to propagate through free space. It can also allow the propagation of inter-facet signals through any material with known refractive properties. Those skilled in the art will know of many suitable materials. Such a material can also be used as a means for mounting the facets, facilitating system alignment. The transmitters referred to in the description can be any article capable of supplying an output optical signal. The receivers referred to in the description can be any article capable of receiving an optical signal.

The particular sizes and equipment discussed above are cited merely to illustrate particular embodiments of the invention. It is contemplated that the use of the invention may involve components having different sizes and characteristics as long as the principle, the use of both holographic optical elements to provide guided wave and non-guided wave communication, is followed. It is intended that the scope of the invention be defined by the claims appended hereto.

We claim:

1. An apparatus to route the output of a first optical transmitter node to a first optical receiver node, comprising:
   a) a plurality of substantially planar optically transmissive plates disposed in an arrangement where at least some of the plates are not parallel with each other;
   b) inter-facet means for communicating optical signals among the plates;
   c) a first holographic optical element mounted with a first plate and having a first hologram that directs optical signals from the first optical transmitter node to the inter-facet means; and
   d) a second holographic optical element mounted with a second plate and having a second hologram that directs optical signals from the inter-facet means to the first optical receiver node,
   wherein the inter-facet means comprises a third holographic optical element containing a third hologram and mounted with the first plate and a fourth holographic optical element containing a fourth hologram and mounted with the second plate;
   wherein the third hologram directs optical signals from the first holographic optical element to the fourth holographic optical element, and the fourth hologram directs optical signals from the third holographic optical element to the second holographic optical element.

2. The apparatus of claim 1 wherein the first and second holograms comprise transmissive holograms.

3. The apparatus of claim 1 wherein the first, second, third, and fourth holograms comprise transmissive holograms.

4. The apparatus of claim 1, wherein the arrangement defines a space with known refractive properties between the plates.

5. The apparatus of claim 1, further comprising a second receiver mounted with the first plate and means for directing optical information from the first transmitter to the second receiver.

6. An apparatus to route the output of a first optical transmitter node to a first optical receiver node, comprising:
   a) a plurality of substantially planar optically transmissive plates disposed in an arrangement where at least some of the plates are not parallel with each other;
   b) inter-facet means for communicating optical signals among the plates;
   c) a first holographic optical element mounted with a first plate and having a first hologram that directs optical signals from the first optical transmitter node to the inter-facet means;
   d) a second holographic optical element mounted with a second plate and having a second hologram that directs optical signals from the inter-facet means to the first optical receiver node;
   e) a second transmitter mounted with the first plate and a second receiver mounted with the first plate and means for directing optical signals from the second transmitter to the second receiver.

7. An apparatus to route the output of a first optical transmitter node to a first optical receiver node, comprising:
   a) a plurality of substantially planar optically transmissive plates disposed in an arrangement;
   b) inter-facet means for communicating optical signals among the plates:
   c) a first holographic optical element mounted with a first plate and having a first hologram that directs optical signals from the first optical transmitter node to the inter-facet means:
   d) a second holographic optical element mounted with a second plate and having a second hologram that directs optical signals from the inter-facet means to the first optical receiver node;
   e) a second optical transmitter node; and
   f) a third holographic optical element mounted with a plate and having a third hologram that directs optical signals from the second optical transmitter node to the inter-facet means.

8. An apparatus for communicating optical signals from a first transmitter to a second receiver and from a second transmitter to a first receiver, comprising
   a) a holographic optical element;
   b) means for directing a first optical signal from the first transmitter to the holographic optical element at a first incidence angle;
   c) means for directing a second optical signal from the second transmitter to the holographic optical element at a second incidence angle not equal to the first incidence angle;
   d) means for mounting the first receiver at a first reception angle relative to the holographic optical element; and
   e) means for mounting the second receiver at a second reception angle not equal to the first reception angle relative to the holographic optical element;
   wherein the holographic optical element has a first hologram that transmits along the first reception angle optical signals arriving at the first incidence angle, and wherein the holographic optical element has a second hologram that transmits along the second reception angle optical signals arriving at the second incidence angle.

9. An apparatus for communicating optical signals from a first transmitter to a second receiver and from a second transmitter to a first receiver, comprising
   a) a holographic optical element;
   b) means for directing a first optical signal having a first wavelength from the first transmitter to the holographic optical element;
   c) means for directing a second optical signal having a second wavelength different from the first wavelength from the second transmitter to the holographic optical element;

d) means for mounting the first receiver at a first reception angle relative to the holographic optical element; and e) means for mounting the second receiver at a second reception angle relative to the holographic optical element not equal to the first reception angle;

wherein the holographic optical element has a first hologram that transmits along the first reception angle optical signals arriving with the first wavelength, and wherein the holographic optical element has a second hologram that transmits along the second reception angle optical signals arriving with the second wavelength.

10. An optical interconnection system comprising:

a plurality of communication nodes formed on a plurality of optically transmissive planar substrates, at least some of which are not parallel with each other;

means to form an optical interconnection between two of the nodes on separate substrates comprising at least one segment of the interconnection being formed by guided total internal reflection within one substrate between a first intermediate communication node and a second intermediate communication node and at least one segment of the interconnection being formed by unguided transmission between substrates between the second intermediate communication node and a third intermediate communication node on another substrate..

11. The system of claim 10 wherein at least some of the communication nodes include holographic optical elements interposed between the substrate and sources of optical information inputs and outputs into and out of the substrate.

12. The system of claim 11 wherein the holographic optical elements comprise dichromated gelatin and the substrates comprise glass.

13. The system of claim 10 wherein the unguided transmission segment is through free space.

14. The system of claim 12 wherein the optical interconnection is a duplex communication pathway.

15. The system of claim 10 wherein at least some of the communication nodes include means to send/receive information at different output/input angle of incidence relative to the adjacent substrate plane as a function of the optical wavelength.

16. The system of claim 10 wherein the planar substrates form a polyhedron.

17. The system of claim 16 wherein the polyhedron is a solid polyhedron.

* * * * *